Patented May 10, 1949

2,469,824

UNITED STATES PATENT OFFICE 2,469,824

METHYLOL DITHIONAPHTHOATES

Albert F. Hardman, Akron, Ohio, assignor to Wingfoot Corporation, Akron, Ohio, a corporation of Delaware No Drawing. Application October 30, 1943, Serial No. 508,404

2 Claims. (Cl. 260—455)

This invention relates to methylol esters of dithiocarboxylic acids. These new compounds are obtained by treating the acid with formaldehyde and, preferably, by treating a salt of a dithiocarboxylic acid, such as the ammonium salt or an alkali metal salt, with formaldehyde in acid solution. When conditions which are otherwise favorable prevail, it may be desirable, or even necessary, to carry out the reaction at a low temperature to retard the rate of the reaction. The new compounds are accelerators of the vulcanization of rubber, and their use as such is covered in my copending application Serial No. 508,406, filed October 30, 1943, now abandoned.

The acids from which the new compounds are formed are dithiocarboxylic acids in which the acid group is connected with a carbon of the acid residue. Ordinarily, this residue will be a hydrocarbon although this is not necessarily the case. The dithioacids include, for example, dithiofuroic acid; dithionaphthoic acid; hydroxy dithionaphthoic acids, such as 2-hydroxy-1-dithionaphthoic acid and 1-hydroxy-2-dithionaphthoic acid, etc.; dithioacetic acid; dithiobenzoic acid; etc. The following examples illustrate the production of these new compounds:

EXAMPLE 1

Methylol dithiofuroate

| | | |
|---|---|---|
| Ammonium dithiofuroate in 150 cc. water | g | 16 |
| Concentrated HCl | g | 11 |
| Formaldehyde (37%) | g | 10 |
| Ice and water | cc | 200 |

The aqueous ammonium dithiofuroate was slowly stirred into a mixture of the hydrochloric acid, formaldehyde, water, and ice. In a few minutes crystals separated. After standing one-half hour, the precipitate was filtered and washed with cold water. It was the desired methylol dithiofuroate which melts at 40° C. A good yield was obtained. It has the formula:

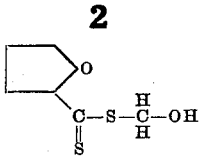

EXAMPLE 2

| | | |
|---|---|---|
| Crude disodium-2-hydroxy-1-dithionaphthoate in 200 cc. water | g | 35 |
| Concentrated HCl | cc | 20 |
| Formaldehyde (37%) | g | 15 |
| Water | cc | 400 |

The aqueous solution of the dithionaphthoate was slowly stirred into a solution of the formaldehyde, acid, and water at room temperature. Orange-colored crystals separated at once. After standing several hours, the solution was filtered, and the precipitate of the methylol-2-hydroxy-1-dithionaphthoate was washed with water. It has a melting point of 152° C. Its formula is:

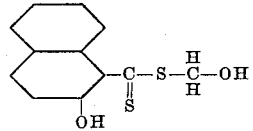

Analysis: Sulfur calculated, 25.6%; sulfur found, 25.2%, 24.9%.

What I claim is:
1. A methylol dithionaphthoate.
2. Methylol-2-hydroxy-1-dithionaphthoate.

ALBERT F. HARDMAN.

REFERENCES CITED

The following references are of record in the file of this patent:

UNITED STATES PATENTS

| Number | Name | Date |
|---|---|---|
| 2,238,331 | Lichty | Apr. 15, 1941 |
| 2,301,118 | Hardman | Nov. 3, 1942 |